United States Patent
Upadhyay

(10) Patent No.: US 9,657,621 B2
(45) Date of Patent: May 23, 2017

(54) SYSTEMS AND METHODS FOR DIFFERENTIAL HEATING OF EXHAUST CATALYSTS

(71) Applicant: Ford Global Technologies, LLC, Dearborn, MI (US)

(72) Inventor: Devesh Upadhyay, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 59 days.

(21) Appl. No.: 14/632,898

(22) Filed: Feb. 26, 2015

(65) Prior Publication Data

US 2016/0251989 A1   Sep. 1, 2016

(51) Int. Cl.
| | |
|---|---|
| F01N 3/00 | (2006.01) |
| F01N 3/02 | (2006.01) |
| F01N 3/10 | (2006.01) |
| F01N 3/20 | (2006.01) |
| F01N 9/00 | (2006.01) |
| F01N 13/00 | (2010.01) |

(52) U.S. Cl.
CPC ........... *F01N 3/2013* (2013.01); *F01N 3/208* (2013.01); *F01N 9/00* (2013.01); *F01N 13/011* (2014.06); *F01N 3/2066* (2013.01); *F01N 2240/16* (2013.01); *F01N 2410/03* (2013.01); *F01N 2560/026* (2013.01); *F01N 2900/1602* (2013.01)

(58) Field of Classification Search
CPC .... F01N 3/0222; F01N 3/0842; F01N 3/0871; B01D 53/9495; Y02T 10/24

USPC ............................................ 60/286–288, 295
See application file for complete search history.

(56) References Cited

U.S. PATENT DOCUMENTS

| | | | | |
|---|---|---|---|---|
| 5,930,994 A | * | 8/1999 | Shimato | F01N 3/023 55/302 |
| 6,447,564 B1 | * | 9/2002 | Ohno | B01D 53/9454 55/282.3 |
| 7,334,400 B2 | * | 2/2008 | Yan | F01N 13/011 423/239.1 |
| 7,550,119 B2 | * | 6/2009 | Kojima | F01N 3/023 422/168 |
| 7,886,529 B2 | | 2/2011 | Gonze et al. | |
| 8,141,359 B2 | | 3/2012 | Yager | |
| 8,701,388 B2 | | 4/2014 | Gonze et al. | |

(Continued)

*Primary Examiner* — Nicholas J Weiss
*Assistant Examiner* — Dapinder Singh
(74) *Attorney, Agent, or Firm* — Julia Voutyras; McCoy Russell LLP

(57) ABSTRACT

Exhaust aftertreatment systems and methods are described for reducing emissions output therefrom. In one example, an exhaust gas aftertreatment system comprises a first catalyst downstream of a branchpoint in a first exhaust pathway, a second catalyst downstream of the branchpoint in a second exhaust pathway, an electrical heater positioned upstream of the branchpoint for heating the exhaust flow, a control unit for adjusting an exhaust heating current of the electrical heater, and a valve for adjusting a distribution of exhaust flow to the first and second catalyst, the control unit including instructions to adjust the valve responsive to a substrate temperature within one or more of the first and second catalysts. In this way, an exhaust system with increased efficiency across a range of operating temperatures is realized that reduces emissions and energy expended during usage.

20 Claims, 9 Drawing Sheets

(56) References Cited

U.S. PATENT DOCUMENTS

| | | | |
|---|---|---|---|
| 8,726,639 B2* | 5/2014 | Stroia | F01N 3/0253 |
| | | | 60/274 |
| 8,776,495 B2 | 7/2014 | Gonze et al. | |
| 8,826,647 B2 | 9/2014 | Gonze et al. | |
| 2006/0010859 A1* | 1/2006 | Yan | F01N 13/011 |
| | | | 60/286 |
| 2007/0044457 A1 | 3/2007 | Upadhyay et al. | |
| 2008/0083215 A1 | 4/2008 | Yan | |
| 2010/0043399 A1* | 2/2010 | Stroia | F01N 3/0253 |
| | | | 60/274 |
| 2014/0157982 A1 | 6/2014 | Ardanese et al. | |

* cited by examiner

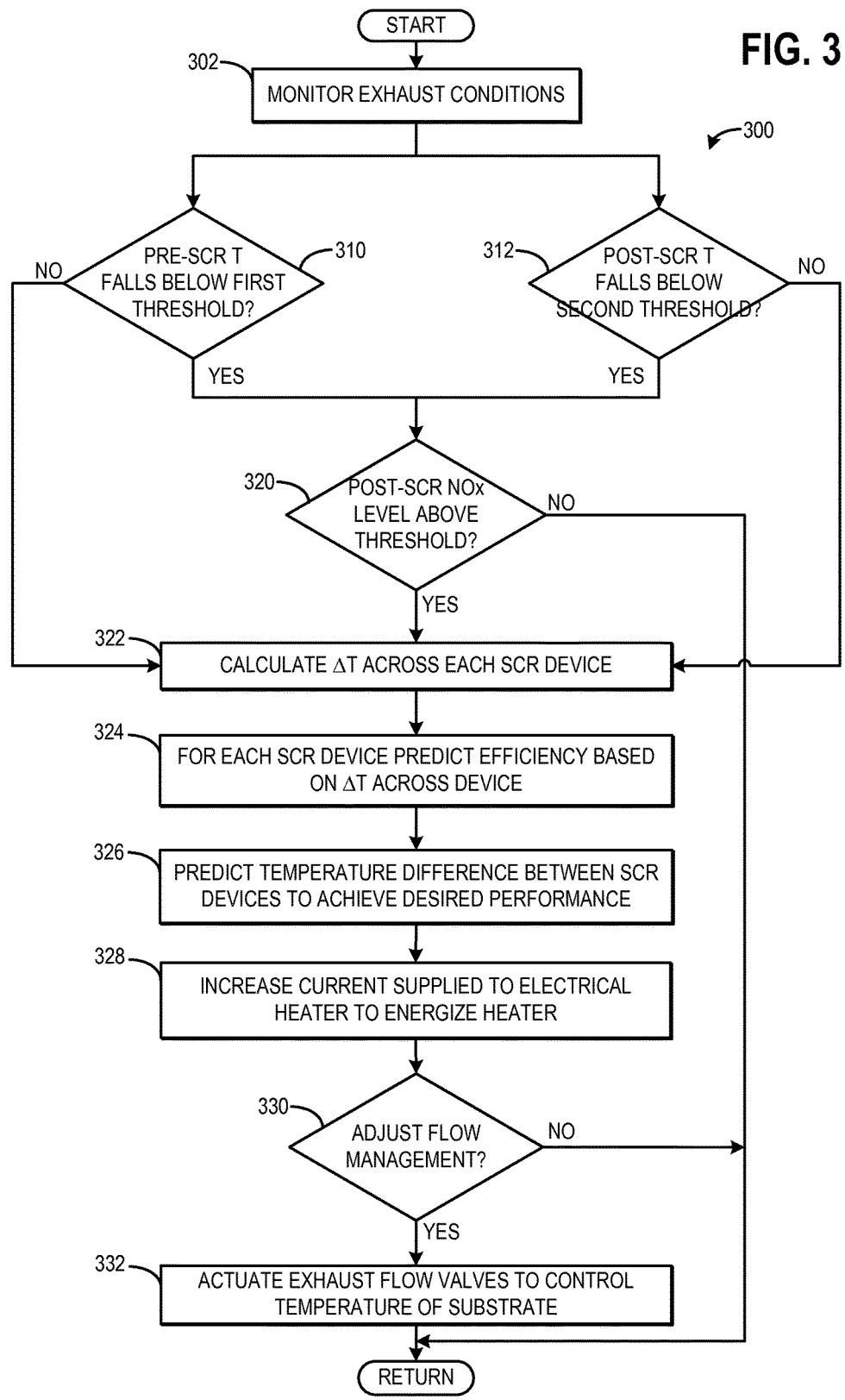

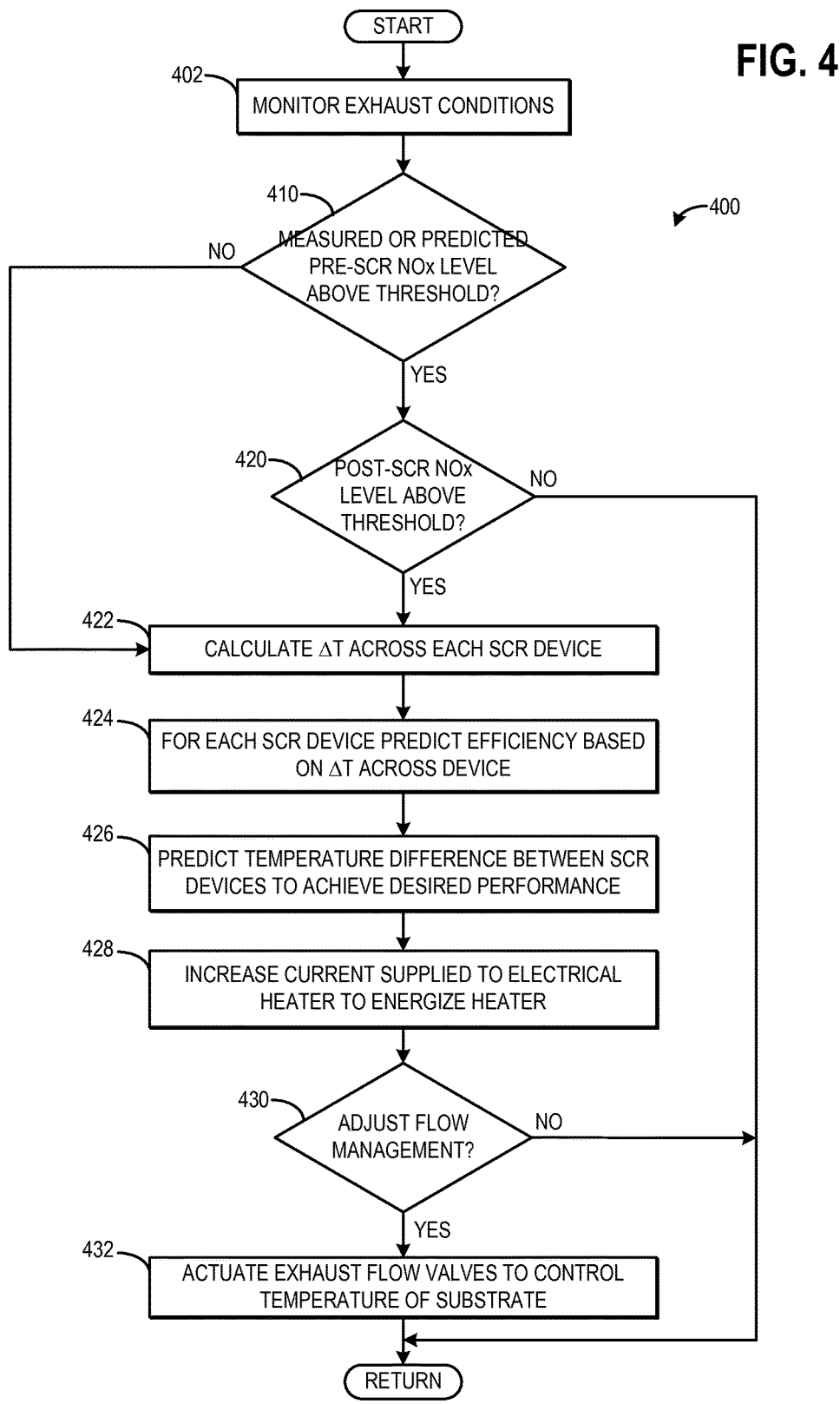

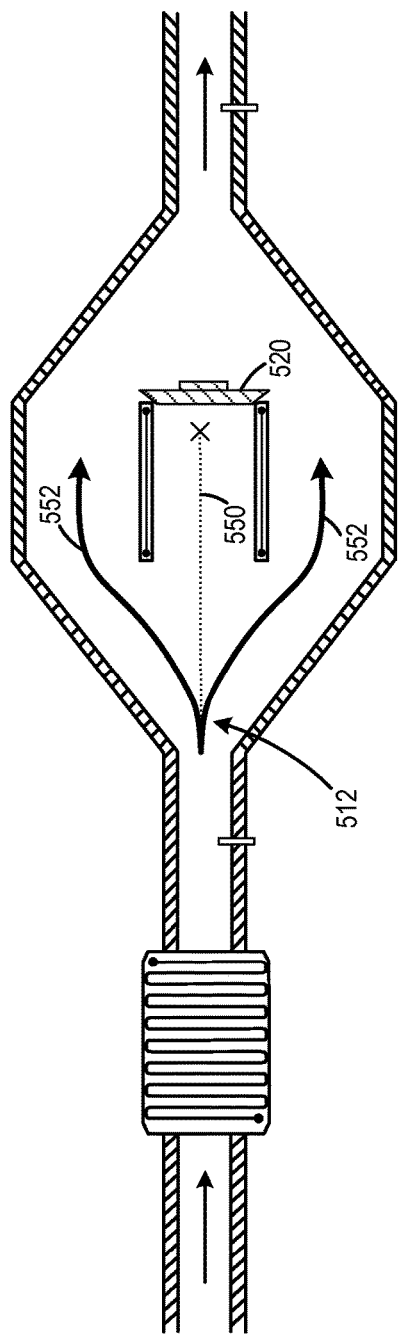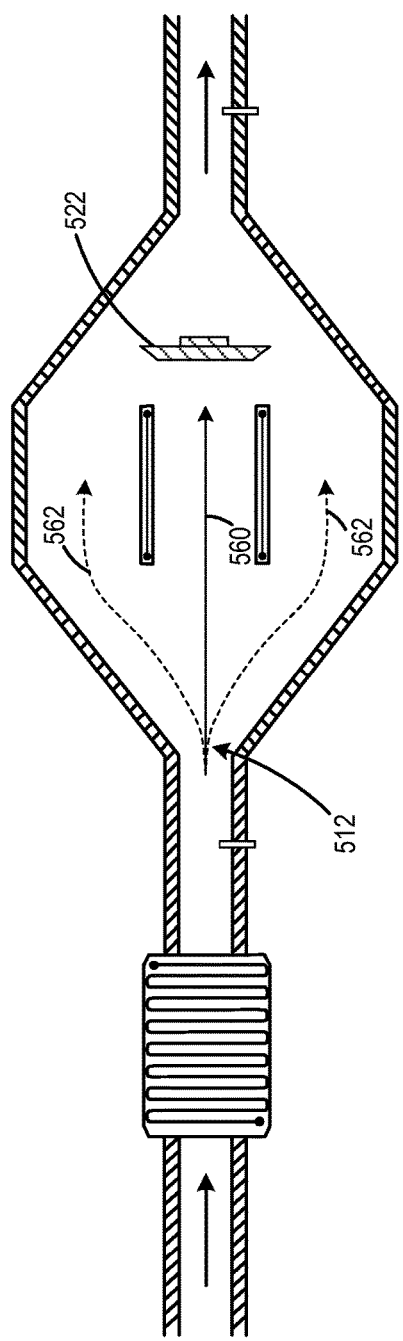

SYSTEMS AND METHODS FOR DIFFERENTIAL HEATING OF EXHAUST CATALYSTS

FIELD

The present description relates to a system and methods for electrically heating an exhaust aftertreatment system having a plurality of catalysts.

BACKGROUND AND SUMMARY

Embedding electrical heaters into exhaust catalysts enhances device performance. Specifically, increasing heater thermal output allows the catalyst temperature to be increased to a point that increases the exhaust efficiency, particularly during periods of low temperature operation. Segmentation of catalyst substrates into zonal regions further provides for targeted heating in the one or more zones. However, previous zonal heating systems employ embedded heaters that rely on radiative and conductive thermal transfer based on heater placement within the catalyst, which may correspond to the zonal regions of the catalyst.

For example, U.S. Pat. No. 7,886,529 discloses a catalyst with multiple bricks arranged in series with a heating element positioned therebetween. U.S. Pat. No. 8,826,647 alternatively discloses a particulate filter segmented into two zones where the electric heater is embedded within the filter. US 2014/0157982 further describes a particulate filter having five zones that can be selectively heated using an electrical heater. Therein, four zones are arranged annularly around a central region while the current is selectively controlled to adjust the heater output within the various zones. With this arrangement, the thermal output in a particular region may depend on managing the zonal heat output based on balancing the energy supply in a region to increase the temperature of the region targeted, and preventing an adjacent or region proximate to the targeted region from also being heated by diffusive heat that spills over into these regions, which may affect a thermal efficiency therein. In this way, control of exhaust heating may become very difficult, particularly in systems with smaller dimensions where available spacing constraint limits the size of the exhaust catalyst.

The inventors have recognized the above-identified, as well as other, issues with such approaches and herein describe exhaust aftertreatment systems and methods for reducing emissions. In particular, an example exhaust gas aftertreatment system described comprises a first catalyst downstream of a branchpoint in a first exhaust pathway, a second catalyst downstream of the branchpoint in a second exhaust pathway, an electrical heater positioned upstream of the branchpoint for heating an exhaust flow, a control unit for adjusting current of the electrical heater, and a valve for adjusting a distribution of exhaust flow to the first and second catalyst, the control unit including instructions to adjust the valve responsive to a substrate temperature within one or more of the first and second catalysts. In this way, the technical result is achieved that an exhaust system may be operated at a higher efficiency across the range of operating temperatures while reducing emissions output from the exhaust system.

Methods for treating exhaust gases are also disclosed. For example, a method is described that comprises electrically heating the exhaust gas, separately determining a temperature differential across two catalysts, actuating a first valve to control an exhaust flow to a first catalyst via a first exhaust pathway, actuating a second valve to control an exhaust flow to a second catalyst via a second exhaust pathway, and differentially heating each of the first and second catalysts using the exhaust flows to the two catalysts. With this arrangement, the combination of valve adjustments and heater output provides for differential control of the electrically heated exhaust flow to each catalyst based on the prevailing conditions within the exhaust, the exhaust flow to each catalyst providing for differential control of a substrate temperature within each catalyst. Inclusion of separate catalysts advantageously allows for different target temperatures to be selected for each catalyst based on a substrate composition therein (e.g., copper vs. iron) to increase the overall efficiency of exhaust operation, which reduces an emission level. In addition, because the first catalyst may reduce emissions more efficiently at a lower temperature compared to the second catalyst that reduces emissions more efficiently at a higher temperature, the methods further comprise adjusting the extent of exhaust flow to each catalyst as a function of temperature. For example, adjustments may increase the exhaust flow to the first catalyst and reduce exhaust flow to the second catalyst in response to a decreasing temperature, whereas adjustments may decrease exhaust flow to the first catalyst and increase exhaust flow to the second catalyst in response to an increasing temperature. Differential control of the exhaust flow in combination with an upstream electrical heater thus allows for a differential temperature control to enhance or increase exhaust system performance during operation.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIG. 3 shows an example flow chart for adjusting an exhaust flow distribution to differentially control the temperature of substrates within each SCR device;

FIG. 4 shows an alternate example flow chart for adjusting an exhaust flow distribution based on an emission level;

FIGS. 6A-B schematically illustrate example flow distributions through the aftertreatment system of FIG. 5.

DETAILED DESCRIPTION

Figure 5:
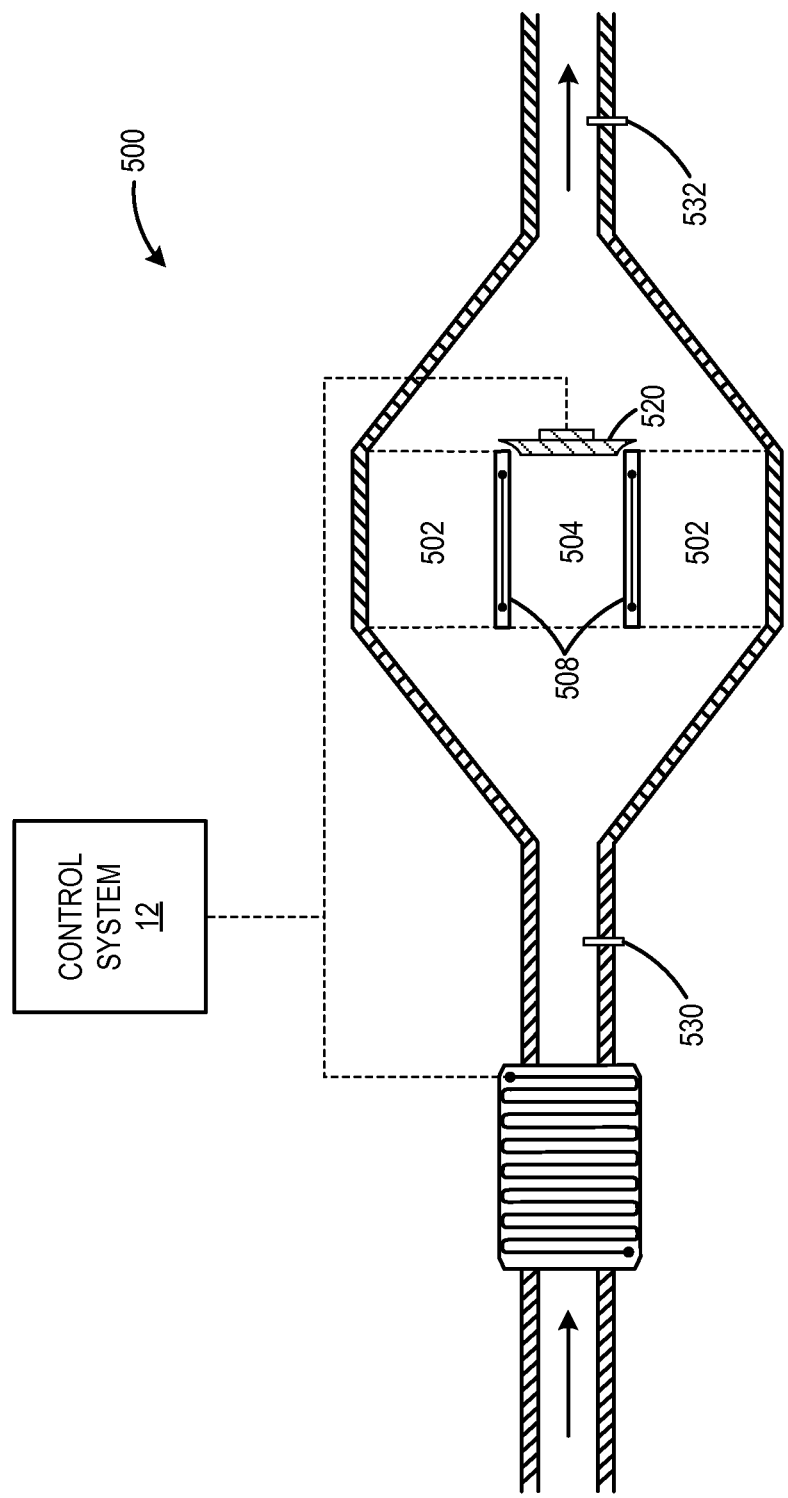
FIG. 5 shows an exemplary aftertreatment system with parallel arranged SCR devices arranged within a single pipe.
Figure 7:
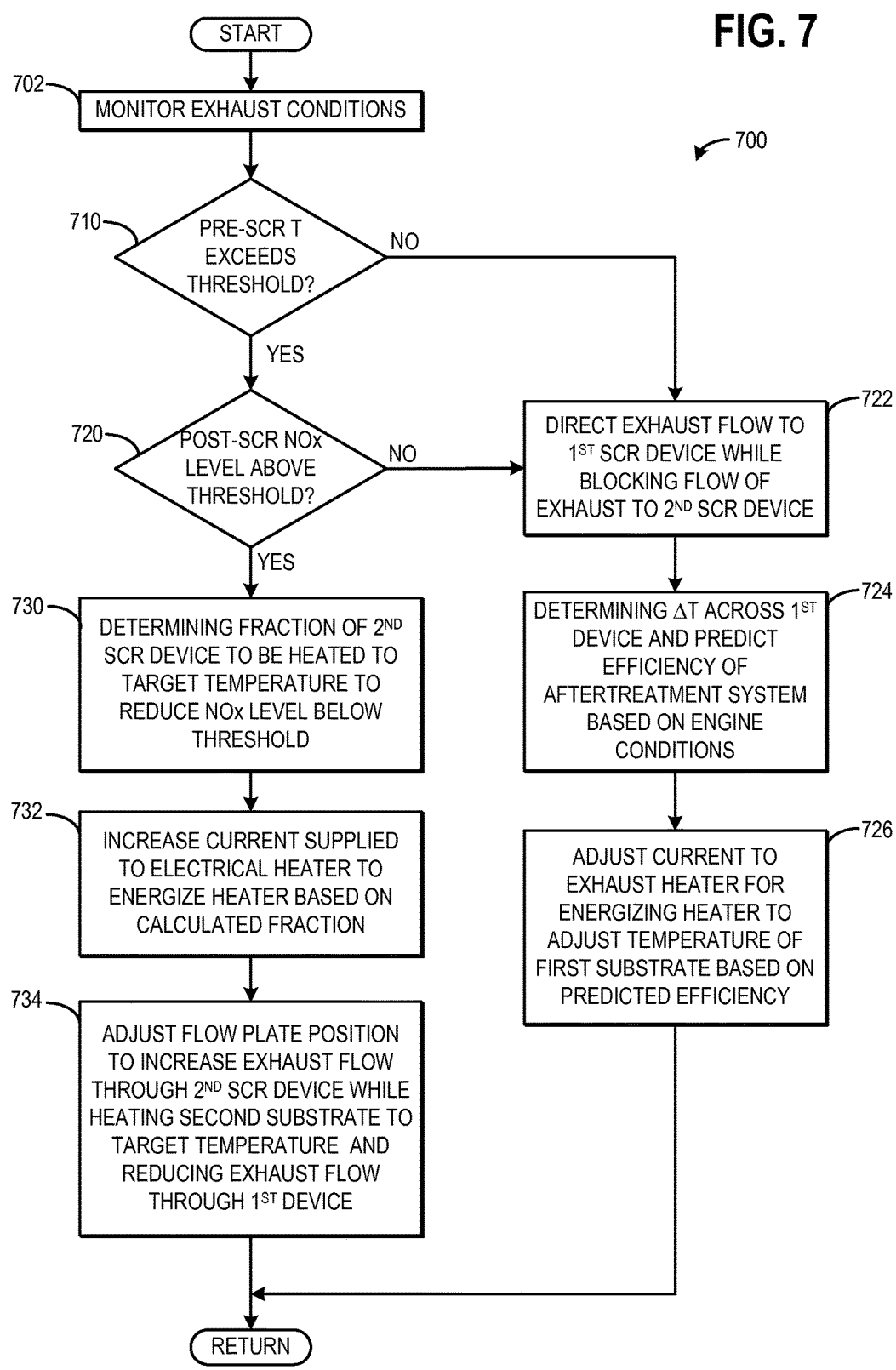
FIG. 7 shows an example flow chart for managing the flow distribution in the aftertreatment system of FIG. 5.

The following description relates to exhaust aftertreatment systems and methods for enhancing exhaust gas treatment to reduce emissions therefrom more efficiently. In one example, an exhaust gas aftertreatment system comprises a first catalyst positioned in a first exhaust pathway arranged in parallel to a second catalyst positioned in a second exhaust pathway. FIG. 1 and FIGS. 2A-C illustrate one such arrangement. According to the present disclosure, the exhaust system is configured with an electrical heater positioned upstream of an exhaust branchpoint for heating the exhaust flow and differentially controlling catalyst substrate temperatures within two catalysts. As such, FIGS. 3 and 4 illustrate exemplary routines for adjusting the thermal output of an electrical heater while adjusting a valve position to adjust the flow distribution to each of the catalysts to selectively control the catalyst substrate temperature. Embodiments are also possible including a single valve in the exhaust aftertreatment system. For this reason, FIG. 5 shows an exemplary system including a single valve with two catalysts arranged for parallel exhaust flow, the two catalysts residing within a single exhaust pipe. Then, FIGS. 6A-B show exemplary exhaust flows to illustrate different exhaust flow distributions within the exemplary exhaust system of FIG. 5. FIG. 7 further shows an example routine for managing the exhaust flow when a single valve is included for adjusting the distribution of exhaust flow.

Figure 1:
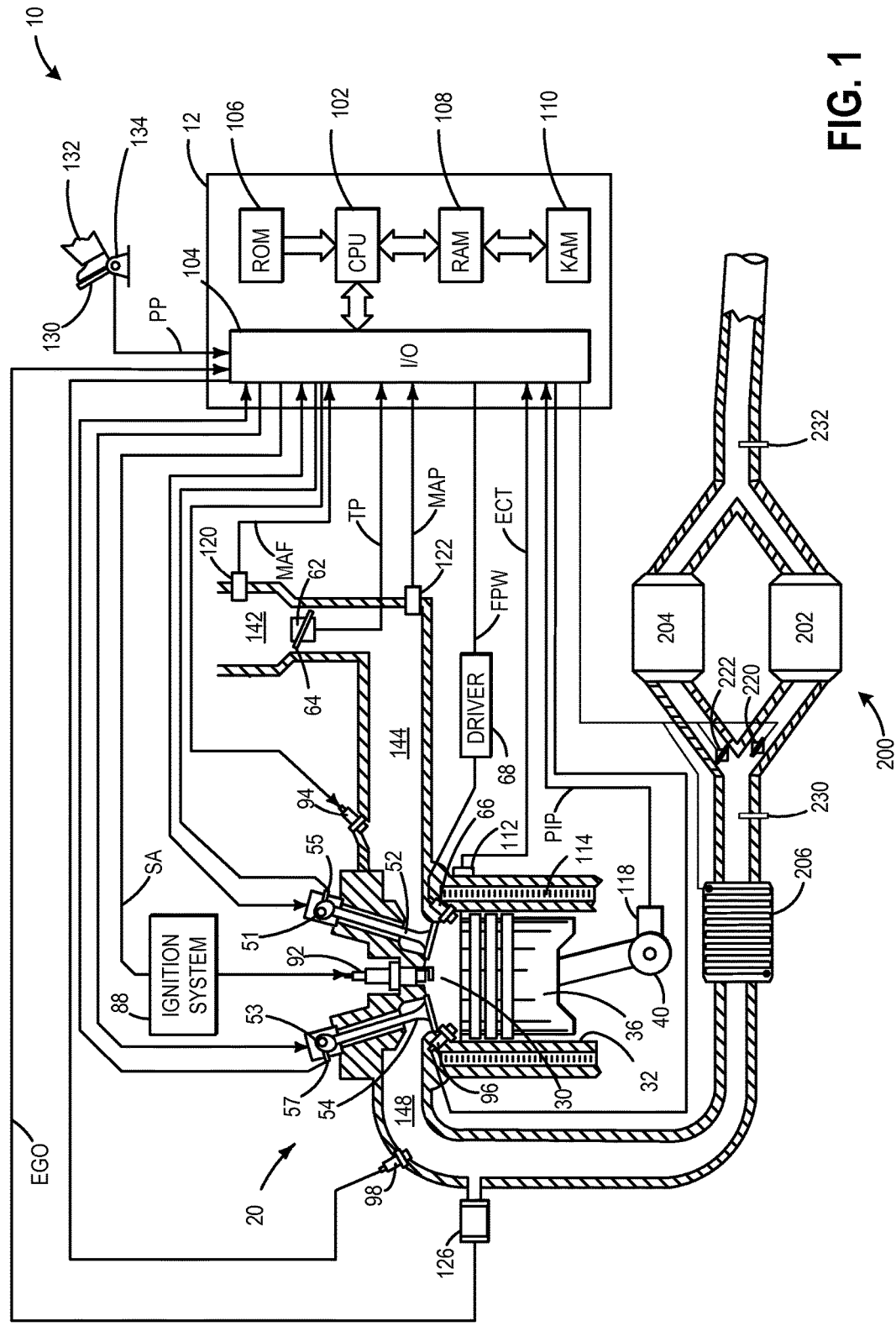
FIG. 1 shows a partial engine view including an exhaust aftertreatment system according to the present disclosure.

FIG. 1 is a schematic diagram showing one cylinder 20 of a multi-cylinder engine 10, which may be included in a propulsion system of an automobile. Engine 10 may be a variable displacement internal combustion engine and/or may be configured to be selectively deactivated responsive to idle-stop condition. Engine 10 may be controlled at least partially by a control system including controller 12 and by input from a vehicle operator 132 via an input device. In one example, the input device includes an accelerator pedal 130 and a pedal position sensor 134 for generating a proportional pedal position signal PP.

Combustion chamber 30 of engine 10 may include cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 144 via intake passage 142 and may exhaust combustion gases via exhaust passage 148. Intake manifold 144 and exhaust passage 148 can selectively communicate with combustion chamber 30 via respective intake valve 52 and exhaust valve 54. In some embodiments, combustion chamber 30 may include two or more intake valves and/or two or more exhaust valves. Exhaust camshaft 53 operates exhaust valve 54 in accordance with the profile of a cam located along the length of the exhaust camshaft. Intake camshaft 51 operates intake valve 52 in accordance with the profile of a cam located along the length of the camshaft. Exhaust cam position sensor 57 and intake cam position sensor 55 relay respective camshaft positions to controller 12.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 144 in a configuration that provides what is known as port injection of fuel into the intake port upstream of combustion chamber 30.

Intake passage 142 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 142 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 148 upstream of exemplary emission control device 200. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 200 is shown arranged along exhaust passage 148 downstream of exhaust gas sensor 126. Although not shown, exhaust passage 148 may further include a three way catalyst (TWC), NOx trap, SCR catalyst, and/or various other emission control devices, or combinations thereof. For example, in some embodiments, a gasoline particulate filter (GPF) may be included within emission control device 200, and located upstream or downstream of an exhaust catalyst in one of the branched passages.

Emission control device 200 includes a first catalyst 202 downstream of a branchpoint in a first exhaust pathway, a second catalyst 204 downstream of the branchpoint in a second exhaust pathway, and electrical heater 206 positioned upstream of the branchpoint for heating the exhaust flow. Heat energy output from the electrical heater is thus transferred to exhaust gases travelling through exhaust passage 148 from, e.g., cylinder 20. According to the present disclosure, heat transferred to the exhaust gases may be used in combination with an exhaust flow to each catalyst to increase the temperature within one or more of the catalysts present to further increase the efficiency or catalytic performance during operation. In other words, the exhaust temperature may be increased through further addition of heat energy that is used to differentially heat a catalyst substrate to a desired temperature, herein referred to as a target temperature. The particular target temperature to which the catalyst substrate is heated, may be selected based on a particular catalyst substrate composition and properties thereof, the target temperature being a temperature at which the catalyst processes exhaust gases more efficiently to reduce emissions emitted from the vehicle.

As described in detail below, a control unit may also be included that is configured to separately determine a temperature differential across a catalyst to determine or estimate the extent or fraction of the catalyst substrate to be raised to a target temperature based on the temperature differential to gain the additional performance with respect to reduced emissions. For example, exhaust gas entering the catalyst upstream may heat a front face of the catalyst brick to a greater extent than the back face of the catalyst brick. Thus, as one example, the fraction of the catalyst to be raised to the target temperature may be determined via heat transfer from the exhaust gas to the catalyst brick, the fraction based on a temperature differential or gradient that extends from the front face of the catalyst to the back face. As such, the controller may selectively control the amount of current supplied to the electrical heater and the exhaust flow rate to each catalyst in order to differentially heat the catalysts to a target temperature that increases the exhaust performance based on the determined extent or fraction of the catalysts that are raised to the target temperatures.

As shown, in some instances, each catalyst of emission control device 200 may be located in different passages downstream of electrical heater 206. To control the flow of exhaust gases, the exhaust system may further include a first valve 220 positioned in the first flow pathway and second valve 222 positioned in the second flow pathway. Although FIG. 1 shows a configuration with two valves for controlling the temperature and exhaust flow distribution, in some embodiments, emission control device 200 may include a single valve, e.g., valve 222, to control the exhaust flow, and thereby, the extent of substrate heating in the two catalysts. That is, according to the present disclosure, the emission control device is used for controlling the distribution of exhaust flow through both the first and second exhaust pathways to control a catalyst substrate temperature in order to selectively place each catalyst in a set of operating conditions that more optimally processes exhaust gases. The control unit may additionally adjust a current supplied to electrical heater 206 to increase a heat output that is used to increase the temperature of the exhaust gas upstream of the branchpoint. Then, adjust one or more valves allows for adjusting a flow distribution to the first and second catalysts for selectively heating each substrate to a target temperature.

An exhaust system based on differential heating of two or more catalysts via heat output from an electrical heater in combination with exhaust flow control advantageously allows for control of each catalyst based on substrate composition. For example, a substrate comprising copper (Cu) may process gases more efficiently at low temperatures to reduce exhaust emissions compared to a substrate comprising iron (Fe). Thus, at exhaust temperatures falling below, e.g., 350° C., a higher proportion of electrically heated exhaust gases may be directed to the catalyst having a Cu composition. Alternatively, at higher temperatures that exceed 350° C., adjustments may be made to divert some flow through the Fe-SCR to increase the proportion of heated exhaust to the catalyst having an Fe composition. In this way, methods described may control a valve position and heater output, e.g., based on a determined fraction of each catalyst substrate to be heated to a target temperature, the target temperature being different for each catalyst and based on the catalyst composition, which provides for differential heating. The methods further comprise increasing the extent of exhaust flow directed to the Cu-SCR, referred to herein as the first catalyst, responsive to a decreasing exhaust temperature since the Cu-SCR may operate more efficiently at lower temperatures, and increasing the extent of exhaust flow directed to the Fe-SCR, or second catalyst, responsive to an increasing exhaust temperature.

Sensors upstream and downstream, e.g., sensors 230 and 232, respectively, may also be included in the exhaust system for determining one or more of an exhaust temperature and/or a NOx emission level. For example, upstream sensor 230 may be a temperature sensor that determines an exhaust gas temperature in exhaust passage 148. Then, based on the determined temperature, a control unit may determine whether electrical heating of the exhaust gas is to occur, for instance, by increasing the amount of current supplied to electrical heater 206. Downstream sensor 232 may be a temperature sensor in one implementation, or may alternatively or additionally be a NOx sensor that monitors exhaust gases output from the engine in another implementation. Feedback from one or more of these sensors provides an indication as to adjustments that provide a more optimal heating, exhaust flow distribution, and thereby a reduction of emissions according to the present disclosure.

Controller 12 is shown in FIG. 1 as a microcomputer, including microprocessor unit 102, input/output ports 104, an electronic storage medium for executable programs and calibration values shown as read-only memory 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; vehicle brake; a profile ignition pickup signal (PIP) from Hall effect sensor 118 (or other type) coupled to crankshaft 40; throttle position (TP) from a throttle position sensor; and absolute manifold pressure signal, MAP, from manifold pressure sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. In one example, sensor 118, which is also used as an engine speed sensor, may produce a predetermined number of equally spaced pulses every revolution of the crankshaft.

Storage medium read-only memory 106 can be programmed with computer readable data representing instructions executable by microprocessor unit 102 for performing the methods described below as well as other variants that are anticipated but not specifically listed.

Controller 12 also receives signals from and provides control signals to a transmission (not shown). Transmission signals may include but are not limited to transmission input and output speeds, signals for regulating transmission line pressure (e.g., fluid pressure supplied to transmission clutches), and signals for controlling pressure supplied to clutches for actuating transmission gears.

As described above, FIG. 1 shows only one cylinder of a multi-cylinder engine, and that each cylinder may similarly include its own set of intake/exhaust valves, fuel injector, spark plug, etc.

Figure 2A:
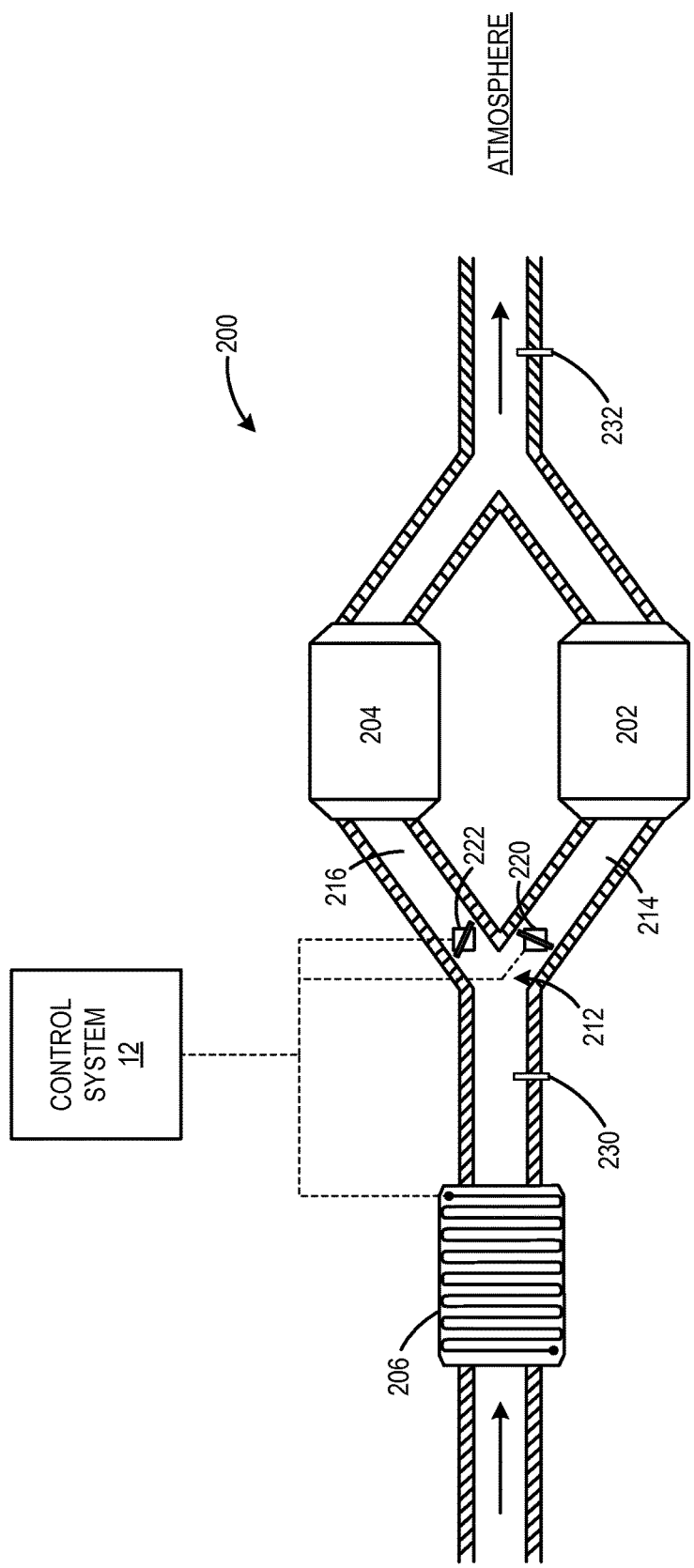
FIGS. 2A-C show exemplary configurations wherein SCR devices are arranged in parallel and reside in different flow pathways.
Figure 2B:
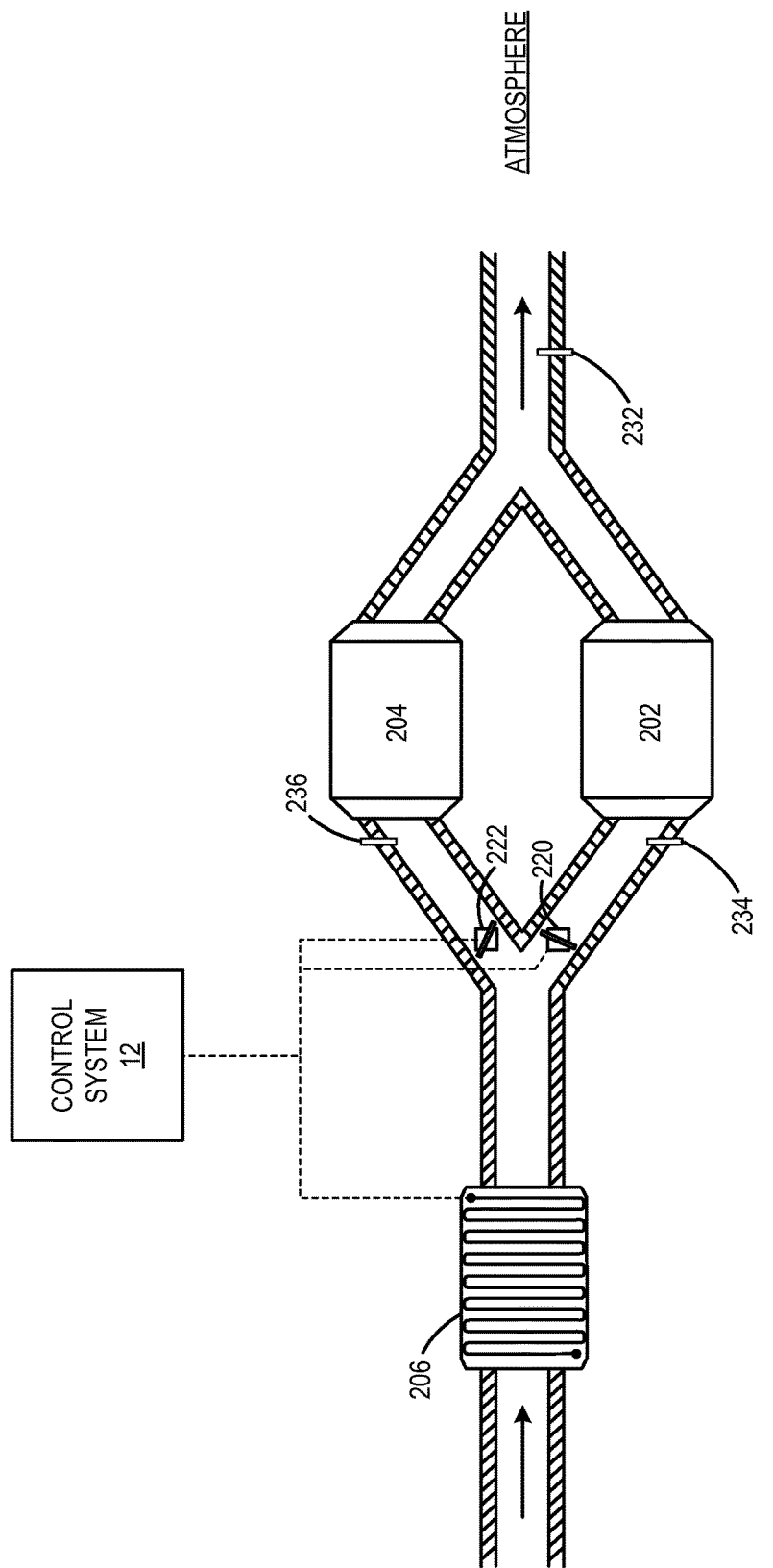
Figure 2C:
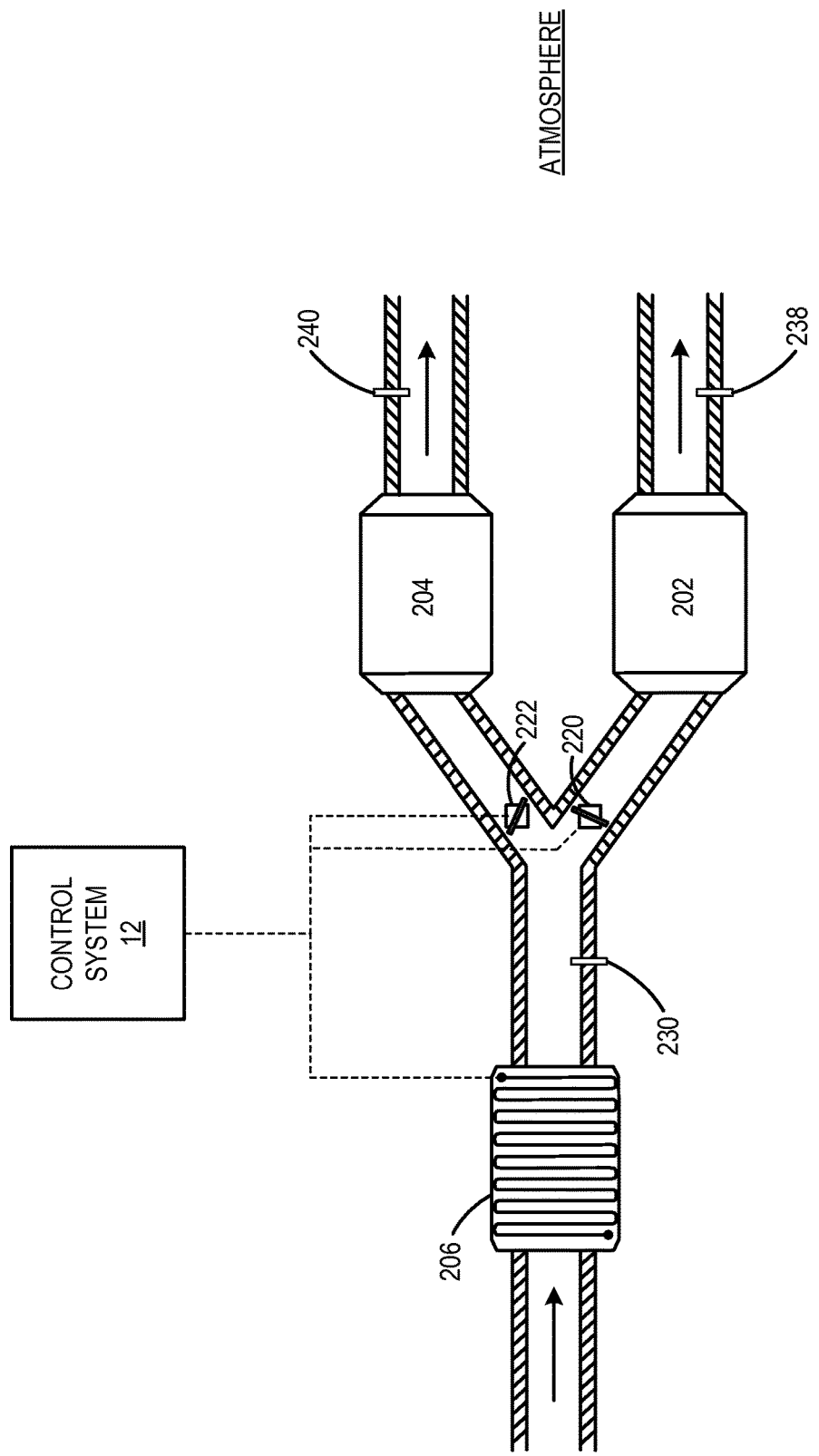

Turning to a more detailed description of emission control system 200, FIGS. 2A-C show exemplary configurations of the parallel flow arrangement wherein SCR devices reside in different exhaust pathways. Then, FIG. 3 shows an example flow chart for adjusting an exhaust distribution while differentially controlling the temperature of SCR substrates based on an exhaust temperature. FIG. 4 further shows an example flow chart for adjusting the exhaust flow distribution based on an emission level.

FIG. 2A shows emission control system 200 including two valves for controlling the distribution of flow within the exhaust passages. As shown, exhaust enters the exhaust system upstream of electrical heater 206 via an exhaust passage, e.g., exhaust passage 148. Thus, upstream of branchpoint 212, a common exhaust flow may be present that is heated by electrical heater 206. Then, downstream of electrical heater 206, the exhaust flow may branch as the exhaust flows through branchpoint 212, the branched exhaust flow provides for selectively diverting a portion of the exhaust gas toward either or both of the first catalyst 202 and second catalyst 204 based on valve position. For this reason, the exhaust system further comprises a first catalyst 202 downstream of branchpoint 212 in first exhaust pathway 214, and second catalyst 204 downstream of branchpoint 212 in a second exhaust pathway 216. Electrical heater 206 is positioned upstream of branchpoint 212 and heats the exhaust flow, the exhaust system being configured with a control unit 12 for adjusting a current supplied to the electrical heater for heating the exhaust gas. To control the distribution of exhaust flow, the exhaust system further includes first valve 220 in first exhaust pathway 214 and second valve 222 in second exhaust pathway 216. Inclusion of two valves advantageously allow for adjusting the exhaust flow distribution to the first and second flow pathways to control a substrate temperature within one or more of the first and second catalysts. Two valves further allows for the exhaust flow to either of the two exhaust catalysts to be shut-off entirely based on a closed position of the valve.

Although the exhaust system of FIG. 2A shows a configuration with two valves, configurations with one valve are also possible. For example, in another representation, the exhaust system may comprise a single valve 222 arranged only in the second exhaust pathway 216 downstream of branchpoint 212 to control the extent of exhaust flow directed to second catalyst 204. In this way, the first catalyst, described herein as a Cu-SCR, may be exposed to exhaust gases under substantially all conditions, while flow is diverted to the second catalyst, described as an Fe-SCR, responsive to an increase in temperature. Thus, according to the present description, the second catalyst may include a substrate whose composition provides for more efficient operation at the higher temperatures. The exhaust system and methods thus allow for the proportion of exhaust flow directed to each catalyst to be controlled during vehicle operation. As one example, the exhaust flow to the second catalyst may be increased responsive to an increasing temperature that exceeds a threshold (e.g., a temperature that rises above 350° C. for Fe-SCR), the threshold indicating a point above which the exhaust gas may be processed more efficiently by the second catalyst. In this way, the extent of the exhaust temperature above the threshold may be associated with an exhaust efficiency. As such, methods are also possible that control the extent of flow diverted to one or the other of each catalyst present onboard a vehicle based on the extent of difference between the exhaust temperature and the threshold.

Returning to the configuration with two valves of FIG. 2A, emission control device 200 further comprises an additional valve (e.g., valve 220) arranged in first exhaust pathway 214 downstream of branchpoint 212 for selectively controlling the exhaust flow to both of the first and second catalysts. As noted already, the selective control provides for adjusting the amount of exhaust flow to each catalyst for differentially controlling the substrate temperature within the first and second catalysts.

For example, controller 12 may include a method for determining the extent of exhaust gas heating that produces a desired exhaust performance based on the exhaust efficiency by a substrate within the catalyst. For example, the extent of heating may be determined using a catalyst partial volume model that calculates a temperature differential across each SCR device, or $\Delta T$. Then, based on the temperature difference determined based on the exhaust conditions (e.g., an exhaust temperature), controller 12 may further determine or predict a processing efficiency based on $\Delta T$ across each device. As one example, the catalyst partial volume model is a model that predicts the fraction of a catalyst, determined from the front face, to be raised to a target temperature to realize or gain additional performance. Then, the methods allow for increasing the temperature of a catalyst brick or substrate based on an influx of heat from the exhaust gas, which may be heated upstream by traversal through the electrical heater coupled to the exhaust passage. The exhaust flow management system may thus gain additional performance for increasing exhaust processing efficiency by controlling the heat added to one or more of the catalyst substrates, the heat being based on the fraction of the substrate to be heated to a target temperature to achieve the additional desired performance. The exhaust system may also or alternatively predict a differential temperature between SCR catalysts, for example, by using a different target temperature for each device based on the substrate composition therein, to heat the exhaust gas to a predetermined temperature by increasing the current supplied to the electrical heater to energize the heater. As described herein, adjustments may also be made that maintain a reduced emission level based on the differential heating during engine operations. Exhaust heating in combination with flow distribution management to the Cu-SCR and Fe-SCR selectively adjusts the heat flux transferred to each device as a means of adjusting the temperature of each device.

As one example, an exhaust flow within exhaust passage 148 may have a temperature near 350° C. However, first catalyst 202 (e.g., Cu-SCR) may include a copper substrate that has a higher efficiency at temperatures below 350° C. relative to the Fe substrate. Alternatively, second catalyst 204 (e.g., Fe-SCR) may include an iron substrate that has a higher efficiency at temperatures above 350° C. relative to the Cu substrate. Therefore, controller 12 may be configured to determine the optimal heating and flow distribution to each of the catalysts to increase the overall exhaust efficiency of the exhaust system. Accordingly, controller 12 may increase the current supplied to electrical heater 206 to increase the temperature above 350° C. Then, valve adjustments via, e.g., first valve 220 and second valve 222, may be made that divert a greater portion of the flow to the Fe-SCR catalyst to increase the heat transferred to the iron catalyst while providing for the fraction of the catalyst substrate to be heated to the Fe-SCR target temperature. Likewise, a smaller portion of the exhaust flow may be directed to the Cu-SCR such that the heat transferred to the copper catalyst transfers sufficient heat to heat the fraction of the catalyst substrate to the Cu-SCR target temperature, which may be different than the target temperature of the Fe-SCR device. In this way, the impending heat flux conditions for each catalyst substrate may be adjusted to increase the overall exhaust catalyst performance during operation.

Upstream sensor 230 is included for detecting one or more of an exhaust temperature and an emission level in the exhaust flow, the sensor being downstream of electrical heater 206. In some instances, feedback from exhaust gas sensor 126 may alternatively or additionally be used for determining adjustments to be made according to the present disclosure. Thus, embodiments are possible where upstream sensor 230 is not present, and exhaust gas sensor 126 instead provides feedback that is used to make the adjustments described. Downstream sensor 232 is further included and may detect one or more of an exhaust temperature and an emission level in the exhaust flow based on a placement within the exhaust flow at a position downstream of the first and second catalysts. Thereby, sensor location may include one or more of upstream of branchpoint 212, downstream of branchpoint 212 and upstream of a catalyst in one or more of the first and second exhaust pathways, and downstream of the first and second catalysts. For example, FIG. 2A shows upstream sensor 230 at a position upstream of branchpoint 212, and downstream sensor 232 at a position where the branched exhaust passages have converged into an only single exhaust flow that exits a vehicle still further downstream. Alternatively, FIG. 2B shows that upstream sensor 230 may be positioned downstream of branchpoint 212 but still upstream of a catalyst in one or more of the first and second exhaust pathways. For this reason, the configuration shown includes first pathway sensor 234 in first exhaust pathway 214, whereas second pathway sensor 236 is positioned in second exhaust pathway 216. Although a single downstream sensor 232 is shown, in some embodiments, individual downstream sensors may also be provided and located in each exhaust pathway downstream of a catalyst in the branched exhaust passages.

FIGS. 2A and 2B illustrate an embodiment wherein first exhaust pathway 214 and second exhaust pathway 216 converge into a single exhaust flow downstream of first catalyst 202 and second catalyst 204. However, embodiments are also possible wherein each exhaust pathway exits the exhaust system separately. For this reason, FIG. 2C illustrates an embodiment wherein first exhaust pathway 214 and second exhaust pathway 216 lead separately to dual exhaust pipes further leading to atmosphere (not shown). In this way, the exhaust system described may process exhaust gases from the engine, e.g., cylinder 20, located upstream of the exhaust system that are further directed downstream to the ambient atmosphere indicated schematically in FIG. 2C. Although not shown explicitly, upstream and downstream refer to positions relative to the branchpoint and/or catalysts and do not include a circuit formed by the ambient environment. Therein, upstream sensor 230 is shown upstream of branchpoint 212 and individual downstream sensors 238 and 240 are shown downstream of first catalyst 202 and second catalyst 204, respectively.

To control the temperature and exhaust gas flow through each exhaust catalyst, control unit 12 may include instructions to adjust one or more of the current supplied to the electrical heater and a position of the valve responsive to the exhaust temperature for controlling the substrate temperature. That is, the controller may be configured to adjust one or more of the current supplied to the electrical heater, the position of a valve, e.g., second valve 222, and the position of an additional valve, e.g., first valve 220, to adjust the exhaust temperature and distribution of exhaust flow to the first and second catalysts for controlling substrate temperatures, the substrate temperatures being based on a fraction of substrate to be heated to a target temperature responsive to the adjustments (e.g., using the catalyst partial volume model).

In this way, an exhaust system according to the present description comprises a first catalyst downstream of a branchpoint in a first exhaust pathway, a second catalyst downstream of the branchpoint in a second exhaust pathway, an electrical heater positioned upstream of the branchpoint for heating an exhaust flow, a control unit for adjusting an exhaust heating current of the electrical heater, and a valve for adjusting a distribution of exhaust flow to the first catalyst and second catalyst, the control unit including instructions to adjust the valve responsive to a substrate temperature within one or more of the first and second catalysts. When one valve is present, the exhaust system includes arranging the valve in the second exhaust pathway downstream of the branchpoint and positioned in exhaust flow entering only the second catalyst. Then, the valve arranged in the second exhaust pathway may be opened responsive to an increasing temperature above a threshold via instructions stored in the control unit, the opening increasing exhaust flow to the second catalyst and reducing exhaust flow to the first catalyst.

When the exhaust system includes an additional valve, the additional valve may be arranged in the first exhaust pathway downstream of the branchpoint and positioned in exhaust flow entering only the first catalyst, the additional valve being cooperatively actuated with the valve arranged in the second exhaust pathway via instructions stored in the control unit, the cooperative actuation selectively controlling the exhaust flow to the first and second catalysts to differentially control the substrate temperature of the first and second catalysts.

With regard to operation, the exhaust system may comprise an upstream sensor for detecting one or more of an exhaust temperature and an emission level in the exhaust flow, the sensor positioned downstream of the electrical heater at one or more of upstream of the branchpoint, downstream of the branchpoint and upstream of a catalyst in one or more of the first and second flow pathways, and downstream the first and second catalysts. In some embodiments, the first and second flow pathways converge downstream of the first and second catalysts into only a single exhaust flow. However, embodiments are possible wherein the first and second flow pathways lead separately to dual exhaust pipes further leading to atmosphere. The control unit includes instructions to adjust one or more of the current supplied to the electrical heater and a valve position responsive to the exhaust temperature for controlling the substrate temperature. Exemplary systems are also possible where a single valve is positioned downstream that controls the flow through each exhaust pathway. For example, when a valve that is a flow plate is arranged downstream of the second catalyst in the second exhaust pathway, the flow plate provides for adjustment of the exhaust flow to the first and second catalysts.

FIG. 3 shows an example flow chart 300 for adjusting an exhaust flow distribution while differentially controlling the temperature of SCR substrates based on an exhaust temperature. FIG. 3 describes a method for treating exhaust gases, the method comprising electrically heating the exhaust gas, separately determining a temperature differential across two catalysts, actuating a first valve to control an exhaust flow to a first catalyst of the two catalysts via a first exhaust pathway, actuating a second valve to control an exhaust flow to a second catalyst of the two catalysts via a second exhaust pathway, and differentially heating each of the first and second catalysts using the exhaust flows to the two catalysts. As described above, the method further comprises adjusting electrical heating of the exhaust gases in combination with one or more of the first and second valves based on a fraction of each catalyst that is to be heated to a target temperature, wherein differentially heating of each catalyst to the target temperature reduces an emission level within the exhaust gas. The advantage of the configuration described is that the methods allow for maintaining the reduced emission level based on the differential heating during engine operations. In other words, adjustments may be made to continually operate the exhaust system with a higher efficiency across the operational range of the vehicle as a function of temperature. In some examples, depending on the conditions identified during operation, adjustments may be made that increase exhaust flow to the first catalyst and reduce exhaust flow to the second catalyst in response to a decreasing temperature; and decrease exhaust flow to the first catalyst and increase exhaust flow to the second catalyst in response to an increasing temperature. As described herein, the first catalyst is a Cu-SCR and the second catalyst is an Fe-SCR.

According to method 300, at box 302, a controller may be configured to monitor one or more exhaust conditions. Herein, the exhaust conditions monitored include a temperature and/or emission level. However, the system may also be configured to monitor other variables such as catalyst substrate temperature, temperature differential across one or more of the catalysts, temperature gradient within a catalyst, exhaust pressure, etc.

For example, at box 310, a pre-SCR temperature may be determined, e.g., by upstream sensor 230 of FIG. 2A, and compared to a predetermined temperature threshold selected to indicate a temperature below which additional energy in the form of heat provides for more efficient exhaust processing. At box 320, a post-SCR NOx level may also be employed that determines an emission level compared to a threshold, the threshold selected to indicate a temperature below which additional heat into the exhaust gas may produce a more optimal processing to further reduce emissions based on the conditions identified. For this reason, the example routine may provide for a low pre-SCR temperature determination and/or a high post-SCR NOx level measurement to be interpreted as an indication that adjustments are to be made to heat one or more of the catalyst substrates. Thereafter, method 300 may proceed to box 322 wherein the adjustments to be made are determined.

Alternatively, at box 312, method 300 includes determining a post-SCR temperature, e.g., by downstream sensor 232 of FIG. 2A, and comparing the downstream temperature to a predetermined temperature threshold selected to indicate a temperature below which additional energy in the form of heat may provide for more efficient exhaust operation. Likewise, at box 320, a post-SCR NOx level may also be employed that determines an emission level compared to a threshold, the threshold selected to indicate a temperature below which additional heat into the exhaust gas may produce a more optimal processing to further reduce emissions based on the conditions identified. For this reason, the example routine may provide for the low post-SCR temperature determination and/or the high post-SCR NOx level measurement to be interpreted as an indication that adjustments are to be made, after which, method 300 proceeds to box 322 wherein the adjustments to be made are determined.

If either of the pre-SCR or the post-SCR temperature exceeds the first and second temperature thresholds, respectively, emission control device 200 may proceed to box 322 by determining ΔT across each of the SCR catalyst devices to further determine exhaust efficiency. Alternatively, if either of the pre-SCR or the post-SCR temperature falls below their respective temperature thresholds while a post-SCR NOx level exceeds an emission threshold, method 300 may also proceed to box 322 to further determine whether adjustments are to be made that heat one or more of the catalyst substrates to increase the efficiency of operation, which thereby acts to enhance exhaust performance with respect to emissions reduction. In this way, the exhaust system may be configured to manage the heat supplied to the exhaust and the branched exhaust flow based on expected thermal properties of the catalyst devices present. The advantage is a differentially operable system for controlling the temperature of each device, the adjustments providing each device to be placed under a set of conditions whereby increased exhaust performance is realized.

At box 324, controller 12 may be configured to predict an efficiency for each SCR device based on ΔT across the device. Although the efficiency predicted is described in terms of each individual SCR device, controller 12 may also determine an overall exhaust efficiency based on individual catalyst devices present, including catalyst composition in some instances. With this arrangement, the exhaust system may make adjustments to manage the heat supplied and exhaust flow/distribution to increase the efficiency of one or more catalyst devices in addition to the overall exhaust efficiency. In some instances, an adjustment to either the heat supplied or exhaust flow may lead to a reduced efficiency within one device while increasing the efficiency of the other device. Controller 12 may therefore be configured to account for such an efficiency tradeoff while ensuring the adjustments made increase the overall exhaust efficiency.

At box 326, controller 12 may further predict a temperature difference between the first catalyst 202 and second catalyst 204 that achieves a desired performance based on differentially heating the catalyst substrates to their respective target temperatures. According to the present disclosure, one or more adjustments may be made to heat and/or redistribute the exhaust flow to deliver a heat flux to each substrate that adjusts a substrate temperature to a target temperature, each target temperature cooperatively providing for the increased catalyst performance based on the conditions employed.

With regard to the adjustments, at box 328, method 300 includes actuating the amount of current supplied to electrical heater 206 to energize the heater. As one example, when a low pre-SCR temperature falls below a temperature threshold such that an increased amount of NOx exceeding a threshold is measured, controller 12 may make operational adjustments based on instructions included therein to increase the amount of current supplied to the heater to increase the heat output therefrom, the heat being further transferred to the exhaust gas as it flows through the exhaust system, which is then transferred downstream to a catalyst substrate to adjust the substrate temperature that increases the operational efficiency.

At box 330, method 300 includes managing the flow by adjusting the extent of exhaust gas directed to each catalyst to further adjust a substrate temperature by, for example, increasing the amount of exhaust directed to a substrate to increase a temperature in at least a fraction of the substrate to a target temperature selected to indicate an optimal efficiency. Thereafter, controller 12 may actuate one or more exhaust flow valves to control the flow responsive to the increased heater output to adjust a heat flux to the catalyst substrate. For example, the extent of heated exhaust directed to second catalyst 204 that is an Fe-SCR may be increased while reducing exhaust flow to first catalyst 202 that is a Cu-SCR responsive to an increased exhaust temperature. As noted above, such adjustments may allow the temperature of the iron substrate to be increased while also receiving a higher proportion of the exhaust gas, which allows for a greater reduction of exhaust emissions.

FIG. 4 shows an example flow chart 400 for adjusting an exhaust flow distribution within the emission control device based on an emission level. Although FIG. 3 flexibly accounts for one or more of a temperature and an emissions level to manage exhaust flow, in some instances, it is possible to adjust the flow based on an expected or measured emission. Method 400 shows one such method.

In the flow chart provided, method 400 is configured to make adjustments in a similar manner as described above with respect to method 300 of FIG. 3. However, method 400 shows a configuration wherein operational adjustments are made based on a measured or predicted emission. As one example, a pre-SCR sensor may indicate a high NOx level. However, a heavy transient signal based on, e.g., a large change in pedal position from an input device such as accelerator pedal 130 may be used to predict a surge in exhaust emissions within exhaust passage 148. In this way, method 400 may determine via one or more of a measured or predicted pre-SCR NOx level relative to an emission threshold that operational adjustments are to be made. For this reason, at box 410, method 400 includes determining the pre-SCR NOx level. Then, at box 420, method 400 includes determining a post-SCR NOx level compared to the threshold to determine whether one or more of the catalysts are operating at a reduced efficiency.

As FIG. 4 indicates, NOx levels above the threshold, which may be different for pre- and post-SCR positions in some instances, may be used to indicate that one or more of the catalysts are not being operated efficiently. Thereafter, in the same manner described above, method 400 may determine a temperature differential across each catalyst substrate and use the temperature differential to predict a catalyst efficiency. Method 400 may further determine the temperature difference between each device to make adjustments that increase the exhaust efficiency during operation. Operational adjustments that increase the electrical heater output and/or adjust the flow distribution then provide a means for increasing exhaust efficiency within the exhaust system to reduce exhaust emissions therefrom.

As noted above, the configuration of FIGS. 2A-C may alternatively be implemented with only one valve in some instances. However, when a single valve is present, valve placement may determine the flow control through the exhaust system. For simplicity, the single valve is described positioned in only the second exhaust pathway to regulate and control the exhaust flow through the second device responsive to increasing temperatures. With this arrangement, a portion of exhaust flow may flow continually through the first catalyst while the proportion or extent of the flow can be controlled responsive to the valve position. For example, when a valve positioned in the second exhaust pathway is closed, all of the exhaust flow may be directed to the first catalyst. However, when the valve is opened, for instance, based on an exhaust temperature exceeding a threshold, a portion of the exhaust flow may be directed to the second catalyst, which reduces the amount of exhaust flow to the first catalyst. In this way, the distribution of exhaust flow within the exhaust system may be adjusted to heat the catalysts in the same manner as described in greater detail above.

In another representation, emission control device 500 has an annular arrangement with a central core that is the second catalyst 504, for example. Thus, as described above, second catalyst 504 may also be an Fe-SCR core surrounded by first catalyst 502, which is a Cu-SCR. Although the system is described in terms of Cu and Fe catalysts, in some instances, the first and second devices may include substrates based on copper, but having a different composition, for example. For simplicity, FIG. 5 shows an annular arrangement wherein the valve is a flow plate 520 (e.g., an adjustable orifice plate) for adjusting the distribution of flow through the first exhaust pathway and first catalyst 502 as well as second exhaust pathway and second catalyst 504. As shown, flow plate 520 may be arranged downstream of second catalyst 504 in the second flow pathway in some instances. However, other valve types and placements are possible.

FIGS. 6A and B show that the position of the flow plate may be used to adjust the exhaust flow through each exhaust device. For example, at FIG. 6A, closure of flow plate 520 directs the exhaust flow through the first exhaust pathway, e.g., to the first catalyst (e.g., 502). As such, halted flow 550 is shown prevented, whereas increased flow 552 is directed to the peripheral edge of the annular system and flows through the first catalyst, e.g., Cu-SCR. Alternatively, FIG. 6B shows the effect of opening flow plate 520, which redirects a portion of the exhaust flow through the second exhaust pathway and through the second catalyst. Thus, increased central flow 560 is shown more heavily to indicate the increased flow, whereas reduced flow 562 through the first catalyst is shown lighter to illustrate the reduced flow in response to the increased flow through the second catalyst. FIGS. 6A and B further show branchpoint 512 schematically, which is the point where each flow diverges separately toward each catalyst device. In this way, separate flow pathways may exist even in the presence of a single exhaust passage.

Returning to FIG. 5, upstream sensor 530 is shown downstream of the electrical heater and upstream of branchpoint 512, as indicated. Downstream sensor 532 is shown in the exhaust passage downstream of the point each separate exhaust flow has converged. In some embodiments, it is possible to achieve a more direct heating by embedding an electrical heater in the annular system between first catalyst 502 and second catalyst 504. For this reason, FIG. 5 shows embedded heater 508 that also has an annular shape, for simplicity.

Inclusion of embedded heater 508 in addition to the electrical heater positioned in the exhaust passage allows for a more fine control of exhaust catalyst heating, in addition to the electrical exhaust heating via heat transfer from the exhaust passage described. In some instances, the embedded heater may allow for a directional heating control, for example, to one or the other of the first and second catalysts. However, in other instances, the heater may apply heat uniformly to the emission control device to increase the heat output and thereby raise the device temperature more quickly. For example, a vehicle operated in a cold environment (e.g., below freezing) may include an embedded heater to increase the temperature of the device more quickly upon a cold start, which may thereafter be operated via the exhaust heat transfer once the engine has reached an operating temperature during operation.

Turning now to a method for controlling the single valve, FIG. 7 shows an example flow chart 700 for managing the flow distribution in the aftertreatment system of FIG. 5, which may also apply to an aftertreatment system configured as shown in FIGS. 1-2C when a single valve is included, for example, a single valve arranged only in the second exhaust pathway.

In one example, the exhaust gas aftertreatment method comprises electrically heating exhaust gas flowing to two catalysts; determining an exhaust temperature upstream of a branchpoint leading separately to the two catalysts, and actuating a valve to control an exhaust flow to each catalyst responsive to the electrical heating and temperatures of each of the two catalysts. However, according to the present disclosure, an electrical heater is also included upstream and provides for further controlling the temperature of the exhaust gas to differentially control the catalyst substrate temperature as a means for increasing the efficiency of the exhaust system. As such, the method further comprises increasing exhaust flow to the first catalyst and reducing exhaust flow to the second catalyst in response to a decreasing temperature; and decreasing exhaust flow to the first catalyst and increasing exhaust flow to the second catalyst in response to an increasing temperature. In addition, the method comprises controlling the extent of exhaust flow to the first and second catalysts to differentially heat the first and second catalysts to first and second target temperatures, the extent of exhaust flow to the first and second catalysts being further controlled based on a fraction of the catalyst to be heated to the target temperature. When a single valve is included, adjustments may be made responsive to one or more temperature thresholds. For this reason, the temperature threshold of flow chart 400 is operated such that the valve is closed responsive to an exhaust temperature below a temperature threshold, the closed valve directing the exhaust flow to a first catalyst arranged in a first exhaust pathway downstream of the branchpoint, and wherein the exhaust flow heats the first catalyst substrate to a first target temperature. Then, the valve may be opened responsive to the exhaust temperature exceeding the temperature threshold, the open valve simultaneously directing the exhaust flow to both the first catalyst arranged in the first exhaust pathway and a second catalyst arranged in a second exhaust pathway, the extent of exhaust directed to the second catalyst being based on a fraction of second catalyst substrate to be heated to a second target temperature. As described herein, an increased exhaust flow to the second catalyst may reduce the exhaust flow to the first catalyst in some instances, and vice versa.

As described above, when an additional valve is present such that a first valve is located in the first exhaust pathway and a second valve is located in the second flow pathway, the method further comprises selectively controlling the exhaust flow to the first and second catalysts via an additional valve that acts cooperatively with the valve while controlling the exhaust flow to the two catalysts. The advantage of two valves is that the exhaust flow to the first catalyst may be prevented in some instances. For example, an Fe-SCR processes exhaust gases with a higher efficiency at higher temperatures, whereas a Cu-SCR has a lower efficiency at higher temperatures (e.g., is more efficient at lower temperatures). Thus, at higher temperatures, substantially all of the exhaust flow may be directed to the second catalyst that operates with a higher efficiency to more efficiently process the exhaust gases. With this configuration, the additional valve is closed to prevent exhaust flow to the first catalyst responsive to a temperature threshold. In addition, the method may further include adjusting the electrical heating in combination with one or more of the valve and the additional valve to adjust a catalyst temperature responsive to engine operation and/or based on one or more of a determined and predicted emission level to reduce an exhaust emission level.

The operational adjustments described allow for adjusting one or more of the heat output from the electrical heater to be adjusted and/or the distribution of exhaust flow based on the vehicle operating conditions. In this way, the methods further comprise actuating one or more of the valve and additional valve (e.g., first and second valves) in combination with the electrical heater upstream of the branchpoint to differentially control the exhaust flow rate to each catalyst, the flow rate to each catalyst heating a substrate front face based on the heat flux delivered via the exhaust gas, the flow rate to each catalyst being further determined by the fraction of each substrate to be heated to a target temperature. As noted above, the methods also allow for operational adjustments based on an emission or exhaust output level. For this reason, the methods may further include determining an emission level at an exit passage downstream of the first and second catalyst and adjusting the exhaust flow distribution to reduce the emission level at the exit passage.

At 702, method 700 includes monitoring one or more exhaust conditions in a similar manner as described above with respect to FIG. 3. For simplicity, method 700 is described using an exhaust temperature and a NOx level. For this reason, at 710, method 700 includes determining a pre-SCR temperature, for instance, using upstream sensor 530. Then, when the temperature exceeds a predetermined threshold, the exhaust flow may be processed efficiently by a combination of first catalyst 502 and second catalyst 504, the distribution of exhaust flow allowing for increased processing efficiency. Alternatively, when an exhaust temperature falls below the temperature threshold, operational adjustments may be made that direct the exhaust flow to first catalyst 502, which has a composition allowing for higher efficiencies at lower temperatures. Thus, method 700 proceeds to 722 by making adjustments to direct exhaust flow to the first catalyst 502 (e.g., first SCR device) while blocking the exhaust flow to second catalyst 504 (e.g., the second SCR device). Then, at 724, the method includes determining $\Delta T$ across the first catalyst 502 and predicting an efficiency of the aftertreatment system based on the temperature difference and/or an engine operating condition. At 726, method 700 includes adjusting a current to the exhaust heater to energize the heater while adjusting a temperature of the exhaust gas based on the heat transferred thereto from the electrical heater. As described in greater detail above, the amount of heat added may be controlled by the current supplied to the electrical heater, which further allows for adjusting the temperature of the first catalyst substrate based on a predicted efficiency increase. In other words, the amount of energy supplied to the electrical heater may be controlled to control the amount of heat transferred to the exhaust gas, which is further used to selectively heat the first catalyst substrate by, for instance, raising the temperature of the catalyst front face to a target temperature. Although not shown, the methods further include predicting the target temperature using a model such as the catalyst partial volume model to predict the fraction of the catalyst front face to be raised to the target temperature to realize the gain in additional performance based on the thermal heat transfer.

Returning to 710, when sufficient heat is present in the exhaust to allow for efficient processing within the catalyst, another exhaust parameter such as the downstream NOx level may provide an indication of the exhaust efficiency. At 720, method 700 thus includes comparing the post-SCR NOx level to a threshold when processing exhaust gases using the exhaust emission control device according to the present disclosure. As described above, when the post-SCR NOx level exceeds the emissions threshold while a pre-SCR temperature exceeds a temperature threshold, the emissions control device may rely upon both the first and second catalysts to process exhaust gases while reducing emissions from the engine. However, if the post-SCR NOx level falls below the emissions threshold, the system may be operating with a sufficient efficiency to continue operation while making no further adjustments. However, the system according to the present disclosure may also continue to make adjustments for increasing the processing efficiency by the first catalyst while blocking flow to the second catalyst. Thereafter, the system may modulate the amount of heat added while continuing to operate at an optimal efficiency based on the engine conditions detected.

At 720, detection of elevated emissions may indicate a higher level of performance may be gained by employing the second catalyst. Thus, at 730, method 700 includes determining the fraction of the second catalyst 504 to be heated to a target temperature to reduce the NOx level below the threshold. As described above, controlled 12 may be configured to determine an optimal combination of heat added, as well as exhaust flow to each of the first and second catalysts to achieve the increased performance. At 732, method 700 may make operational adjustments to increase the current supplied to the electrical heater positioned upstream of the branchpoint in order to energize the heater based on the calculated fraction and/or separate exhaust flows to each catalyst. At 734, method 700 further includes adjusting the position of flow plate 520 to increase the exhaust flow through second catalyst 504 while heating the second substrate to a target temperature. The adjustments may further include reducing the exhaust flow to first catalyst 502 to further modulate the temperature therein responsive to the adjustments made.

In this way, the exhaust aftertreatment system described may advantageously allow for the exhaust gas to be heated using an electrical heater, and further provide for control of the heat transferred to one or more catalyst substrates arranged in a parallel flow configuration. A system and method according to the present disclosure thus allows for a more optimal use of an exhaust heater to differentially control a catalyst substrate temperature, which allows for increased operational efficiencies and a reduction in emissions therefrom, as well as increased energy savings during usage.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust system, comprising:
   a first catalyst downstream of a branchpoint in a first exhaust pathway,
   a second catalyst downstream of the branchpoint in a second exhaust pathway,
   an electrical heater positioned upstream of the branchpoint for heating an exhaust flow delivered to both the first and second catalysts,
   a control unit with instructions for adjusting an exhaust heating current of the electrical heater,
   a valve for adjusting a distribution of exhaust flow to the first catalyst and the second catalyst,
   the control unit including instructions to adjust the valve responsive to a substrate temperature within one or more of the first and second catalysts, and
   differentially heat the first catalyst to a first target temperature using a first exhaust flow and the second catalyst to a second target temperature using a second exhaust flow.

2. The exhaust system of claim 1, wherein the valve is arranged in the second exhaust pathway downstream of the branchpoint and positioned in exhaust flow entering only the second catalyst, and wherein the first and second catalysts are selective catalytic reduction (SCR) devices.

3. The exhaust system of claim 2, wherein the valve arranged in the second exhaust pathway is opened responsive to an exhaust gas temperature above a threshold and increasing via instructions stored in the control unit, the opening increasing exhaust flow to the second catalyst and reducing exhaust flow to the first catalyst, and wherein the first catalyst is comprised of a different catalytic substrate than the second catalyst.

4. The exhaust system of claim 3, further comprising an additional valve arranged in the first exhaust pathway downstream of the branchpoint and positioned in exhaust flow entering only the first catalyst, the additional valve being cooperatively actuated with the valve arranged in the second exhaust pathway via instructions stored in the control unit, the cooperative actuation selectively controlling the exhaust flow to the first and second catalysts to differentially control the substrate temperature of the first and second catalysts, and wherein the first catalyst is comprised of a copper SCR (Cu-SCR) and the second catalyst is comprised of an iron SCR (Fe-SCR).

5. The exhaust system of claim 4, further comprising an upstream sensor for detecting one or more of an exhaust temperature and an emission level in the exhaust flow, the sensor positioned downstream of the electrical heater at one or more of upstream of the branchpoint, downstream of the branchpoint and upstream of a catalyst in one or more of the first and second pathways, and downstream of the first and second catalysts, and wherein the first catalyst has an optimum conversion efficiency at a first, lower temperature and the second catalyst has an optimum conversion efficiency at a second, higher temperature.

6. The exhaust system of claim 5, wherein the first and second pathways converge downstream of the first and second catalysts into only a single exhaust flow, and wherein differentially controlling the substrate temperature of the first and second catalysts includes adjusting the exhaust flow to the first catalyst to heat the first catalyst to the first temperature and adjusting the exhaust flow to the second catalyst to heat the second catalyst to the second temperature.

7. The exhaust system of claim 5, wherein the first and second pathways lead separately to dual exhaust pipes further leading to atmosphere.

8. The exhaust system of claim 6, wherein the control unit includes instructions to adjust one or more of a current supplied to the electrical heater and a valve position responsive to the exhaust temperature for controlling the substrate temperature.

9. The exhaust system of claim 3, wherein the valve is a flow plate arranged downstream of the second catalyst in the second exhaust pathway, the flow plate providing for adjustment of the exhaust flow to the first and second catalysts.

10. An exhaust gas aftertreatment method, comprising:
electrically heating exhaust gas flowing to two catalysts;
determining an exhaust temperature upstream of a branchpoint leading separately to the two catalysts;
actuating a valve to control an exhaust flow to each catalyst responsive to the electrical heating and temperatures of each of the two catalysts, where controlling the exhaust flow includes delivering a first exhaust flow to the first catalyst and a second exhaust flow to the second catalyst; and
differentially heating the first catalyst to a first target temperature using a first exhaust flow and the second catalyst to a second target temperature using a second exhaust flow.

11. The method of claim 10, further comprising increasing the first exhaust flow and reducing the second exhaust flow in response to the exhaust temperature decreasing; and decreasing the first exhaust flow and increasing the second exhaust flow in response to the exhaust temperature increasing.

12. The method of claim 11, further comprising controlling the first and second exhaust flows to differentially heat the first catalyst to a first target temperature and the second catalyst to a second target temperature, wherein the first and second target temperatures are different temperatures based on a composition of the first and second catalysts, the first and second target temperatures being temperatures at which the first and second catalysts, respectively, have an optimum conversion efficiency.

13. The method of claim 12, wherein an extent of exhaust flow to the first and second catalysts is further controlled based on a fraction of each catalyst to be heated to the first and second target temperatures, the fraction of each catalyst being based on a differential temperature across the respective catalysts.

14. The method of claim 13, further comprising selectively controlling the exhaust flow to the first and second catalysts via an additional valve that acts cooperatively with the valve while controlling the exhaust flow to the two catalysts.

15. The method of claim 14, wherein the additional valve is closed to prevent exhaust flow to the first catalyst responsive to a temperature threshold, and wherein the exhaust gas is heated upstream of the branchpoint.

16. The method of claim 14, further comprising adjusting the electrical heating in combination with one or more of the valve and the additional valve to adjust a catalyst temperature responsive to engine operation.

17. The method of claim 16, further including adjusting the catalyst temperature based on one or more of a determined and predicted emission level to reduce an exhaust emission level.

18. A method for treating exhaust gases, comprising:
electrically heating exhaust gas upstream of a branchpoint,
separately determining temperature differentials across each of two catalysts, the catalysts located downstream of the branchpoint,
actuating a first valve to control a first exhaust flow to a first catalyst of the two catalysts via a first exhaust pathway,
actuating a second valve to control a second exhaust flow to a second catalyst of the two catalysts via a second exhaust pathway, and
differentially heating the first catalyst to a first target temperature using the first exhaust flow and the second catalyst to a second target temperature using the second exhaust flow,
wherein the actuating of the first and second valves is based on an exhaust as temperature and the temperature differentials.

19. The method of claim 18, further comprising adjusting electrical heating of the exhaust gases in combination with one or more of the first and second valves based on a fraction of each catalyst that is to be heated to a target temperature, wherein differentially heating of each catalyst to the target temperature reduces an emission level within the exhaust gas.

20. The method of claim 19, further comprising maintaining the reduced emission level based on the differential heating during engine operation, and wherein the first target temperature is different from the second target temperature, where the first and second target temperatures are based on respective substrates of the first and second catalysts, the substrate of the first catalyst being different from the substrate of the second catalyst.

* * * * *

UNITED STATES PATENT AND TRADEMARK OFFICE
CERTIFICATE OF CORRECTION

PATENT NO. : 9,657,621 B2  
APPLICATION NO. : 14/632898  
DATED : May 23, 2017  
INVENTOR(S) : Devesh Upadhyay Page 1 of 1

It is certified that error appears in the above-identified patent and that said Letters Patent is hereby corrected as shown below:

In the Claims

Column 20, Line 44, Claim 18, "as" should read "gas".

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*